E. L. Bergstresser.
Seeding Attachment to Hoes.
No. 75843. Patented Mar. 24, 1868.
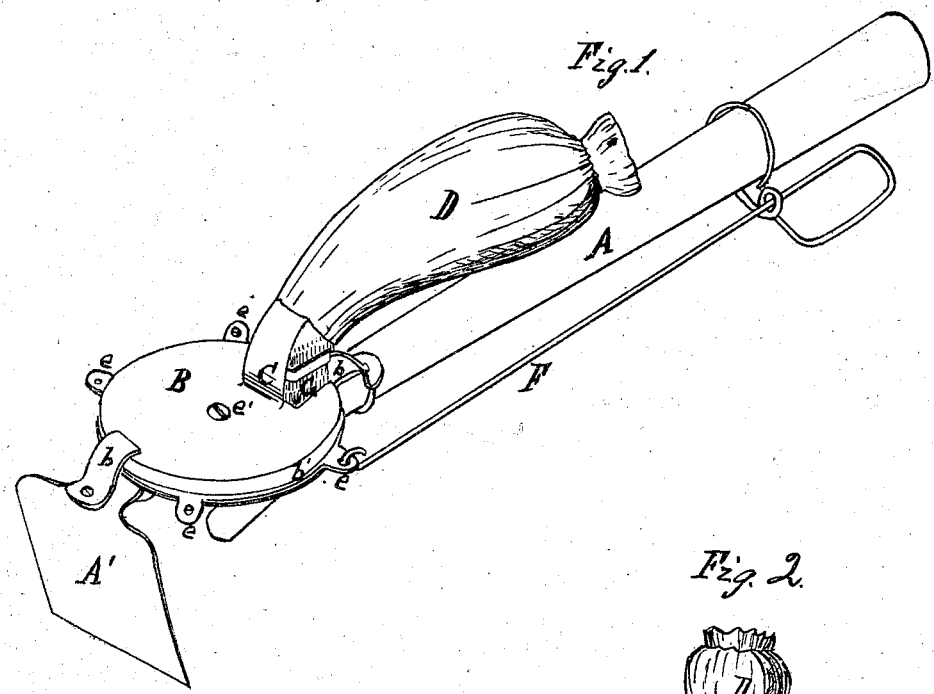
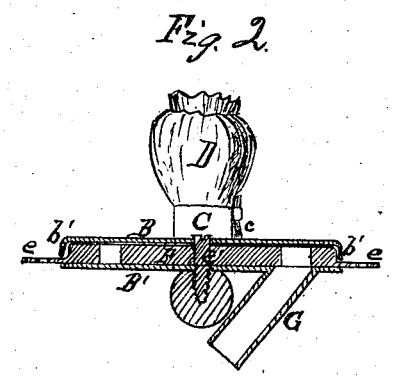
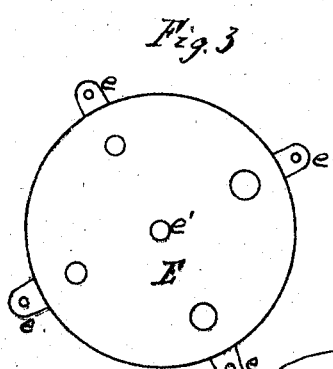
Witnesses.
Alex Mahon
Thos. W. Cridler
Inventor.
E. L. Bergstresser
by his Attorney
A. W. Smith

United States Patent Office.

EDWIN L. BERGSTRESSER, OF HUBLERSBURG, PENNSYLVANIA.

Letters Patent No. 75,843, dated March 24, 1868.

IMPROVEMENT IN SEEDING-ATTACHMENT TO HOES.

The Schedule referred to in these Letters Patent and making part of the same.

TO ALL WHOM IT MAY CONCERN:

Be it known that I, EDWIN L. BERGSTRESSER, of Hublersburg, county of Centre, and State of Pennsylvania, have invented certain new and useful Improvements in Seeding-Attachment to Hoes; and I do hereby declare the following to be a full, clear, and exact description of the same, reference being had to the accompanying drawings making a part of this specification, in which—

Figure 1 is a perspective view of a hoe with my improved seeding-attachment applied.

Figure 2 is a transverse section of the same, and

Figure 3 is a plan view of the perforated feed-disk detached.

Similar letters of reference denote corresponding parts in all the figures.

My invention relates to a novel construction and arrangement of seeding-devices, to be used in connection with an ordinary hoe, as hereinafter described.

A A' represent a hoe, of any usual or desired construction, to which two circular plates, B B', are secured, in the manner shown in figs. 1 and 2, the lower plate, B, being secured directly to the handle A by means of screws or bolts, and the upper plate B being provided with straps or flanges, $b\ b$, through which it is united to the handle A and blade A'. The upper circular plate has a flange, $b'$, upon its lower edge, and upon its upper face is provided with a short tube or hopper, C, to which is connected the lower end of a seed-bag or receptacle, D, which may be made of any suitable material, such as leather, cloth, wood, or sheet metal, arranged over the handle, and secured at its upper end thereto, for giving it a proper support. If preferred, however, the handle of the hoe itself may be made hollow, and used as the seed-receptacle. E is a flanged perforated seed-disk, arranged between the disks B B', and enclosed or surrounded by the flange $b'$ on the former, the flanges $e$, four or more in number, projecting underneath the flange $b'$, and forming arms, through which, by means of a sliding rod, F, the operator is enabled to vibrate the said seed-disk upon a central pivot, $e'$, which passes through disks B B' and E, as represented in fig. 2. The disk E has a series of perforations of different sizes, and corresponding in number to the number of arms $e$. $c$ is a brush or striker, arranged at one side of the hopper-tube, which serves to regulate the quantity of seed conveyed from the seed-receptacle at each vibration of disk E. G is a seed-tube, connected to the lower plate B' at an angle of twenty to thirty degrees (more or less) with the hopper C, and inclined in such direction as to deposit the seed passing through the same in front of the blade A'.

In operation, the disk E is vibrated by means of rod F and one of the flanges $e$, to bring one of the perforations underneath the tube or hopper C, or outlet to the seed-receptacle D, to receive the seed therefrom, after which it is vibrated sufficiently far to bring said perforation over the seed-tube G, allowing the seed to escape through the same, and to be deposited upon the ground in front of the hoe-blade A', and into the hole formed in the ground thereby for the reception of the seed when the hoe may be used for covering the same.

Any one of the perforations in the disk may be used, according to the kind of seed to be planted, or the number of grains it is desired to deposit in a hill, by simply detaching the rod F from one arm, $e$, adjusting the disk, and attaching the rod to another arm, $e$. The rod F may serve simply to move the perforations underneath hopper C, and a spring may be applied to retract the disk E, to bring the perforation over the seed-tube G, or the disk may be operated in both directions by the attendant, as preferred.

Having thus described my invention, what I claim, and desire to secure by Letters Patent, is—

1. The adjustable vibrating-disk E, applied to and used in connection with the hoe, substantially as described.

2. The stationary disks B B', or their equivalent, and vibrating perforated disk E, arranged and operating substantially as described.

3. The disks B B' and E, hopper C, and seed-tube G, in combination with the hoe A A', arranged and operating as described.

In testimony whereof, I have hereunto subscribed my name, this 25th day of January, 1868.

EDWIN L. BERGSTRESSER.

Witnesses:
HENRY McEWEN,
ANTHONY CARNER.